(12) United States Patent
Mittermaier et al.

(10) Patent No.: US 9,745,074 B2
(45) Date of Patent: Aug. 29, 2017

(54) AIRCRAFT PROPELLER DRIVE SYSTEM

(71) Applicant: BRP-POWERTRAIN GMBH & CO. KG, Gunskirchen (AT)

(72) Inventors: Harald Mittermaier, St. Marienkirchen am Hausruck (AT); Johann Bayerl, Stadl-Paura (AT); Michael Dopona, Bad Hall (AT); Thomas Baumgartner, Bruck-Waasen (AT)

(73) Assignee: BRP-POWERTRAIN GMBH & CO KG, Gunskirchen (AT)

( * ) Notice: Subject to any disclaimer, the term of this patent is extended or adjusted under 35 U.S.C. 154(b) by 153 days.

(21) Appl. No.: 14/870,971

(22) Filed: Sep. 30, 2015

(65) Prior Publication Data
US 2017/0088283 A1 Mar. 30, 2017

(51) Int. Cl.
*B64D 35/02* (2006.01)
*B64D 27/02* (2006.01)

(52) U.S. Cl.
CPC ............. *B64D 35/02* (2013.01); *B64D 27/02* (2013.01)

(58) Field of Classification Search
CPC ........ B64D 27/02; B64D 35/00; B64D 35/02; B64C 11/008; B64C 27/12; B64C 27/14; F16H 1/22; F16H 37/06; F16H 37/065
USPC ........... 244/60; 192/48.5, 48.6; 464/97, 180, 464/183
See application file for complete search history.

(56) References Cited

U.S. PATENT DOCUMENTS

| | | | |
|---|---|---|---|
| 1,965,742 A | 7/1934 | Junkers | |
| 2,166,896 A | 7/1939 | Nissen | |
| 2,437,954 A | 3/1948 | Havill | |
| 2,480,946 A * | 9/1949 | McDowall | F16F 15/16 74/433.5 |
| 2,512,103 A * | 6/1950 | Hoffman | B64D 35/04 192/114 R |
| 2,738,660 A | 3/1956 | Gail | |

(Continued)

FOREIGN PATENT DOCUMENTS

| | | |
|---|---|---|
| DE | 3123586 A1 | 6/1982 |
| DE | 3717632 A1 | 12/1988 |

(Continued)

OTHER PUBLICATIONS

English abstract of DE10042674; retrieved from http://worldwide.espacenet.com/ on Sep. 30, 2015.

(Continued)

*Primary Examiner* — Tien Dinh
*Assistant Examiner* — Brady W Frazier
(74) *Attorney, Agent, or Firm* — BCF LLP

(57) ABSTRACT

An aircraft propeller drive system has a gear to be driven by an engine and having a first plurality of teeth. A torsion bar has a first end driven by the gear and a second end rotatable relative to the first end about a torsion axis by a torsion angle. An output shaft is driven by the second end and is adapted for connection to a propeller. A clutch has a driven member rotationally fixed to the output shaft and a driving member having a second plurality of teeth. The first and second pluralities of teeth engage each other when a variation in the torsion angle from a mean torsion angle is greater than a predetermined angle. Torque is transferred between the gear and the output shaft via the clutch when the first and second pluralities of teeth engage each other.

16 Claims, 11 Drawing Sheets

(56) References Cited

U.S. PATENT DOCUMENTS

| | | | |
|---|---|---|---|
| 3,007,350 A | 11/1961 | Wiseman | |
| 3,834,181 A | 9/1974 | Strasburg et al. | |
| 4,872,624 A | 10/1989 | Hawener et al. | |
| 5,111,707 A | 5/1992 | Sugiyama | |
| 5,924,928 A * | 7/1999 | Stegman | F16D 3/68 464/73 |
| 6,095,923 A | 8/2000 | Kageyama | |
| 6,883,752 B2 | 4/2005 | Koch et al. | |
| 6,938,747 B2 * | 9/2005 | Schreiber | F16D 13/52 192/70.2 |
| 8,128,442 B2 | 3/2012 | Konakawa et al. | |
| 2003/0089822 A1 * | 5/2003 | Koch | B64D 27/04 244/60 |
| 2006/0225690 A1 | 10/2006 | Arov | |
| 2010/0038473 A1 * | 2/2010 | Schneider | B64D 27/24 244/60 |

FOREIGN PATENT DOCUMENTS

| | | |
|---|---|---|
| DE | 4030221 A1 | 3/1992 |
| DE | 10042674 A1 | 3/2002 |
| DE | 102010054405 A1 | 6/2012 |
| EP | 1419963 A1 | 5/2004 |
| GB | 925325 A | 5/1963 |
| GB | 1199175 A | 7/1970 |
| JP | S5891956 A | 6/1983 |
| JP | S63172057 A | 7/1988 |
| JP | 2005291103 A | 10/2005 |
| JP | 2006336622 A | 12/2006 |
| JP | 2007138818 A | 6/2007 |
| JP | 04411043 B2 | 11/2009 |
| JP | 2010249111 A | 11/2010 |
| WO | 9801686 A1 | 1/1998 |

OTHER PUBLICATIONS

English abstract of EP1419963; retrieved from http://worldwide.espacenet.com/ on Sep. 30, 2015.
English abstract of DE3123586; retrieved from http://worldwide.espacenet.com/ on Sep. 30, 2015.
English abstract of JP2007138818; retrieved from http://worldwide.espacenet.com/ on Sep. 30, 2015.
English abstract of DE4030221; retrieved from http://worldwide.espacenet.com/ on Sep. 30, 2015.
English abstract of JP2006336622; retrieved from http://worldwide.espacenet.com/ on Sep. 30, 2015.
English abstract of DE102010054405; retrieved from http://worldwide.espacenet.com/ on Sep. 30, 2015.
English abstract of JP04411043B2; retrieved from http://worldwide.espacenet.com/ on Sep. 30, 2015.
English abstract of JPS63172057; retrieved from http://worldwide.espacenet.com/ on Sep. 30, 2015.
English abstract of JPS5891956; retrieved from http://worldwide.espacenet.com/ on Sep. 30, 2015.
English abstract of JP2010249111; retrieved from http://worldwide.espacenet.com/ on Sep. 30, 2015.
English abstract of JP2005291103; retrieved from http://worldwide.espacenet.com/ on Sep. 30, 2015.

* cited by examiner

AIRCRAFT PROPELLER DRIVE SYSTEM

FIELD OF TECHNOLOGY

The present technology relates to aircraft propeller drive systems.

BACKGROUND

Many airplanes are powered by one or more propellers driven by one or more intermittent combustion internal combustion engines, such as two-stroke or four-stroke internal combustion engines. In many such airplanes, during operation, the engine turns its corresponding propeller at a constant speed, which is commonly referred to as a constant-speed propeller. In order to address the changes in power requirements, the pitch of the propeller blades of the propeller is changed instead of changing the speed of the engine.

Each engine is connected to its corresponding propeller via a propeller drive system. The propeller drive system typically includes a plurality of gears arranged such that the propeller turns at a slower speed than a crankshaft of the engine.

Due to its mass and dimensions, the propeller has a high moment of inertia. Therefore, when the propeller turns during operation of the airplane, it tends to do so at a constant speed. On the other hand, the speed of rotation of the crankshaft of the engine varies. The speed of rotation of the crankshaft increases during power strokes of the engine and decreases during compression strokes of the engine. As a result, the portion of the propeller drive system that is connected to the propeller rotates at a constant speed, but the portion of the propeller drive system that is connected to the crankshaft of the engine varies in speed. This causes stress and wear of the gears in the propeller drive system and also causes noise and vibration.

Also, should resonance of the propeller drive system occur, the vibrations increase and the problems associated with these vibrations are exacerbated. In order to avoid resonance during most operating conditions, some propeller drive systems are designed with a stiffness that results in a resonance frequency that occurs at a speed of rotation that is below the idle speed of the engine. Therefore, during the normal operation range of the engine, which is at idle speed and higher, resonance of the propeller drive system should not occur. However, during engine start-up, the engine goes from rest to the idle speed of the engine, and as such at some point will turn at the speed that causes resonance of the propeller drive system. As such, during engine start-up, resonance of the propeller drive system occurs, which causes strong vibrations and may even cause the crankshaft to rotate backwards momentarily. As a result, the engine control unit that is responsible for the control of the fuel injection and ignition, among other things, may receive erroneous signals regarding the speed of rotation and position of the crankshaft, which could prevent successful engine start-up.

There is therefore a need for a propeller drive system that can dampen the torque peaks associated with the changes in speed of the crankshaft during operation of the engine and/or can avoid or reduce the impact of resonance of the propeller drive system during start-up of the engine.

SUMMARY

It is an object of the present technology to ameliorate at least some of the inconveniences present in the prior art.

According to one aspect of the present technology, there is provided an aircraft propeller drive system for an aircraft. The aircraft has a propeller driven by an intermittent combustion internal combustion engine via the propeller drive system. The propeller drive system has a gear adapted to be operatively connected to and driven by the engine. The gear has a first plurality of teeth. A spacing of adjacent teeth of the first plurality of teeth along a pitch circle of the gear has an arc length. A torsion bar has a first end and a second end opposite the first end. The first end is connected to and driven by the gear about a torsion axis. The second end is rotatable relative to the first end about the torsion axis by a torsion angle. An output shaft is fixedly connected to and driven by the second end of the torsion bar. The output shaft is adapted for being connected to the propeller. A clutch has a driving member and a driven member. The driven member is rotationally fixed to the output shaft. The driving member has a second plurality of teeth. Teeth of the second plurality of teeth have a circular thickness. The second plurality of teeth selectively engages the first plurality of teeth. The circular thickness is less than the arc length of the spacing of adjacent teeth of the first plurality of teeth such that when one tooth of the second plurality of teeth is received and centered between two adjacent teeth of the first plurality of teeth the one tooth of the second plurality of teeth is angularly spaced from each of the two adjacent teeth of the first plurality of teeth by a clearance angle of at least 0.75 degrees. The second plurality of teeth engages the first plurality of teeth when a variation in the torsion angle from a mean torsion angle is greater than the clearance angle. Torque is transferred between the gear and the output shaft via the clutch when the second plurality of teeth engages the first plurality of teeth.

In some implementations of the present technology, the output shaft is at least partially hollow. The torsion bar is disposed at least partially inside the output shaft. The output shaft and the torsion bar are coaxial.

In some implementations of the present technology, the gear, the torsion bar, the output shaft and the clutch are coaxial.

In some implementations of the present technology, the output shaft is disposed inside the driven member of the clutch. The first plurality of teeth is a plurality of internal teeth. The second plurality of teeth is a plurality of external teeth. The driving member of the clutch is disposed at least partially inside the gear.

In some implementations of the present technology, the torsion bar passes through the gear and is coaxial with the gear.

In some implementations of the present technology, the clutch is a first clutch. The aircraft propeller drive system also has a second clutch having a driving member and a driven member. The driven member of the second clutch is rotationally fixed to the first end of the torsion bar. The driving member of the second clutch is formed by a portion of the gear. The gear drives the torsion bar via the second clutch.

In some implementations of the present technology, the first and second clutches are slip friction clutches. The second clutch has a higher slip torque than the first clutch.

In some implementations of the present technology, the gear is a first gear having a third plurality of teeth. The aircraft propeller drive system also has a second gear adapted to be operatively connected to and driven by the engine. The second gear has a fourth plurality of teeth engaging the third plurality of teeth. The first gear is driven by the engine via the second gear.

According to another aspect of the present technology, there is provided an aircraft having a fuselage, wings connected to the fuselage, an intermittent combustion internal combustion engine connected to the fuselage or one of the wings, a propeller drive system connected to the engine, and a propeller connected to the propeller drive system and driven by the engine via the propeller drive system. The propeller drive system has a gear operatively connected to and driven by the engine. The gear has a first plurality of teeth. A spacing of adjacent teeth of the first plurality of teeth along a pitch circle of the gear has an arc length. A torsion bar has a first end and a second end opposite the first end. The first end is connected to and driven by the gear about a torsion axis. The second end is rotatable relative to the first end about the torsion axis by a torsion angle. An output shaft is fixedly connected to and driven by the second end of the torsion bar. The output shaft is connected to the propeller. A clutch has a driving member and a driven member. The driven member is rotationally fixed to the output shaft. The driving member has a second plurality of teeth. Teeth of the second plurality of teeth have a circular thickness. The second plurality of teeth selectively engages the first plurality of teeth. The circular thickness is less than the arc length of the spacing of adjacent teeth of the first plurality of teeth such that when one tooth of the second plurality of teeth is received and centered between two adjacent teeth of the first plurality of teeth the one tooth of the second plurality of teeth is angularly spaced from each of the two adjacent teeth of the first plurality of teeth by a clearance angle of at least 0.75 degrees. The second plurality of teeth engages the first plurality of teeth when a variation in the torsion angle from a mean torsion angle is greater than the clearance angle. Torque is transferred between the gear and the output shaft via the clutch when the second plurality of teeth engages the first plurality of teeth.

In some implementations of the present technology, the output shaft is at least partially hollow. The torsion bar is disposed at least partially inside the output shaft. The output shaft and the torsion bar are coaxial.

In some implementations of the present technology, the gear, the torsion bar, the output shaft and the clutch are coaxial.

In some implementations of the present technology, the output shaft is disposed inside the driven member of the clutch. The first plurality of teeth is a plurality of internal teeth. The second plurality of teeth is a plurality of external teeth. The driving member of the clutch is disposed at least partially inside the gear.

In some implementations of the present technology, the torsion bar passes through the gear and is coaxial with the gear.

In some implementations of the present technology, the clutch is a first clutch. The propeller drive system also has a second clutch having a driving member and a driven member. The driven member of the second clutch is rotationally fixed to the first end of the torsion bar. The driving member of the second clutch is formed by a portion of the gear. The gear drives the torsion bar via the second clutch.

In some implementations of the present technology, the first and second clutches are slip friction clutches. The second clutch has a higher slip torque than the first clutch.

In some implementations of the present technology, the gear is a first gear having a third plurality of teeth. The propeller drive system also has a second gear adapted to be operatively connected to and driven by the engine. The second gear has a fourth plurality of teeth engaging the third plurality of teeth. The first gear is driven by the engine via the second gear.

According to another aspect of the present technology, there is provided a method for transmitting power from an intermittent combustion internal combustion engine to a propeller of an aircraft. The propeller is connected to an output shaft. The method comprises: driving the output shaft with the engine via a torsion bar, the torsion bar having a first end operatively connected to the engine and a second end connected to the output shaft, the second end being rotatable relative to the first end about a torsion axis by a torsion angle; and transferring torque between the output shaft and the engine via a clutch only when a variation in the torsion angle from a mean torsion angle is greater than or equal to a predetermined torsion angle.

In some implementations of the present technology, driving the output shaft with the engine via the torsion bar comprises driving the first end of the torsion bar via a gear driven by the engine; and transferring torque between the output shaft and the engine via the clutch comprises transferring torque between the output shaft and the gear via the clutch.

In some implementations of the present technology, the clutch is a first clutch. Driving the first end of the torsion bar via the gear comprises driving the first end of the torsion bar with the gear via a second clutch.

In some implementations of the present technology, the gear has a first plurality of teeth. A spacing of adjacent teeth of the first plurality of teeth along a pitch circle of the gear has an arc length. The clutch has a driving member having a second plurality of teeth. Teeth of the second plurality of teeth have a circular thickness. The second plurality of teeth selectively engages the first plurality of teeth. The circular thickness is less than the arc length of the spacing of adjacent teeth of the first plurality of teeth such that when one tooth of the second plurality of teeth is received and centered between two adjacent teeth of the first plurality of teeth the one tooth of the second plurality of teeth is angularly spaced from each of the two adjacent teeth of the first plurality of teeth by a clearance angle of at least 0.75 degrees. The predetermined torsion angle is the clearance angle.

For purposes of the present application, the term "intermittent combustion internal combustion engine" refers to an engine which operates as a result of the periodic combustion of air and fuel, such as in a two-stroke, four-stroke or Wankel rotary engine. Also for purposes of the present application, terms related to spatial orientation such as forward, rearward, left and right are as they would be understood by a pilot of an aircraft sitting in the aircraft in a normal piloting position with the aircraft being at 0 degree of pitch and 0 degree of roll.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with respect to an airplane having a single variable pitch propeller powered by an intermittent combustion internal combustion engine. It is contemplated that at least some aspects of the present technology could be applied to an airplane having a fixed pitch propeller and/or having multiple propellers and/or in a different type of aircraft.

Figure 1:
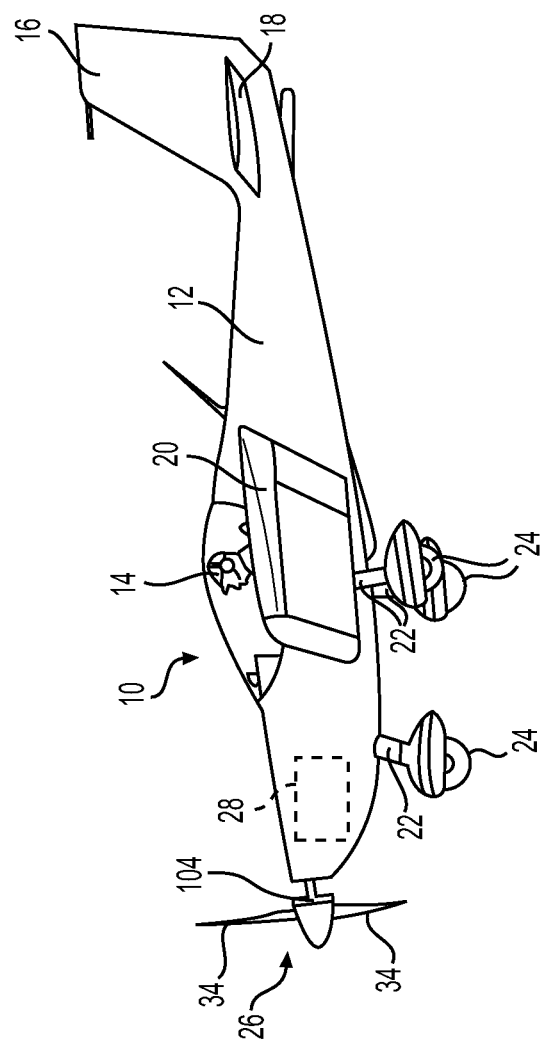
FIG. 1 is a left side view of an airplane.

As can be seen in FIG. 1, an aircraft, specifically an airplane 10, has a fuselage 12 defining a cockpit 14 for accommodating a pilot. It is contemplated that the fuselage 12 and the cockpit 14 could be designed to also accommodate one or more passengers. A vertical stabilizer 16 is connected to the rear end of the fuselage 12. A pair of horizontal stabilizers 18 (only the left one being shown) is connected to the vertical stabilizer 16. A pair of wings 20 (only the left one being shown) is connected to the bottom of the fuselage 12. It is contemplated that the wings 20 could be connected to the top or the sides of the fuselage 12. It is also contemplated that airplane 10 could have more than two wings 20 and/or that the wings 20 could be integrally formed with the fuselage 12. Three landing gears 22 are provided on the bottom of the fuselage 12. In the present implementation, the landing gears 22 are provided with wheels 24 and are not retractable. It is contemplated that other types of landing gears 22 could be used. For example, the wheels 24 could be replaced with skis, skids or floats and/or the landing gears 22 could be retractable. A variable pitch propeller 26 is provided at the front of the fuselage 12. It is contemplated that the airplane 10 could have two or more propellers 26 and/or that the propeller(s) 26 could be provided on the wings 20 or elsewhere on the airplane 10. It is also contemplated that the propeller 26 could be a fixed pitch propeller 26. The engine 28 (schematically shown in FIG. 1) powering the the propeller 26 is located in and connected to the front of the fuselage 12. The airplane 10 has many other components, but these will not be described herein.

Figure 2:
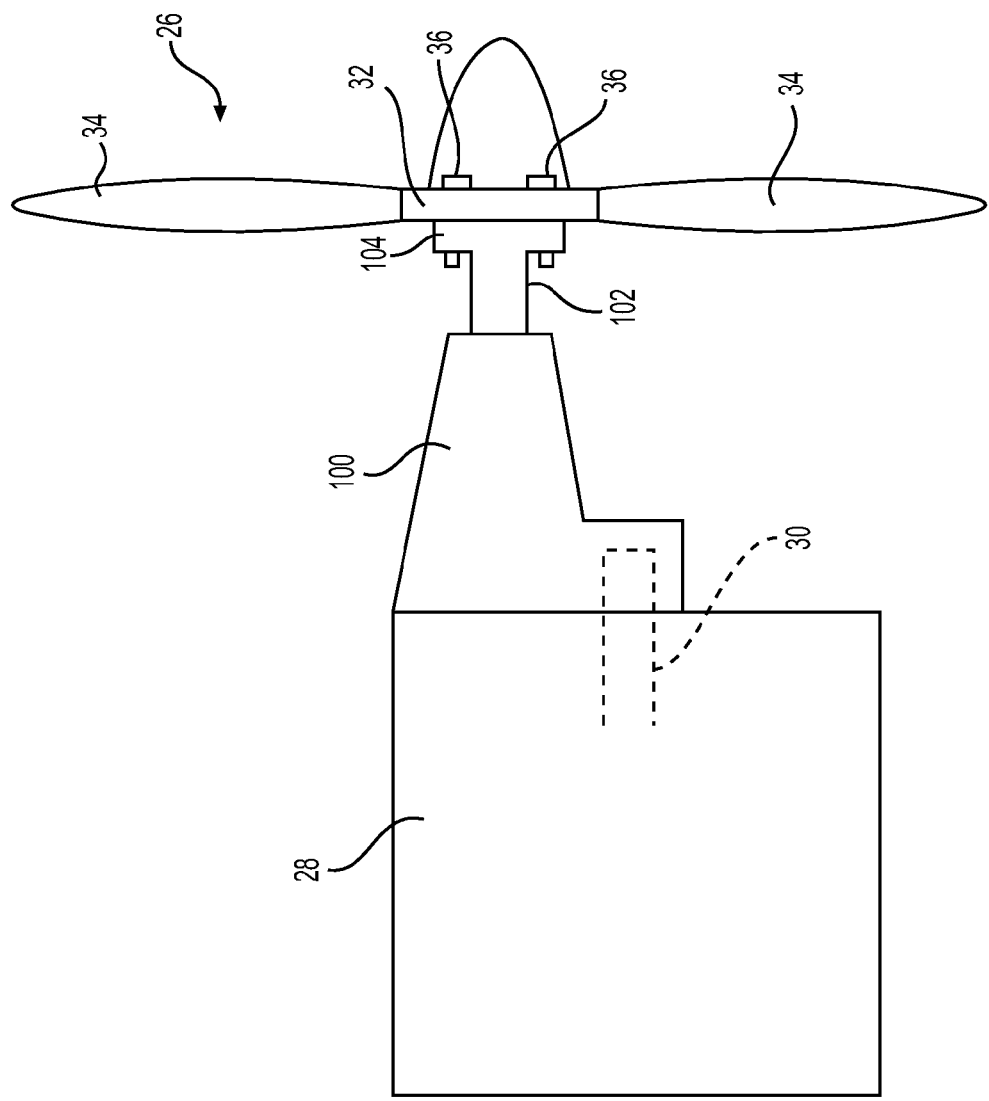
FIG. 2 is a schematic right side elevation view of an engine, propeller drive system and propeller of the airplane of FIG. 1.
Figure 4:
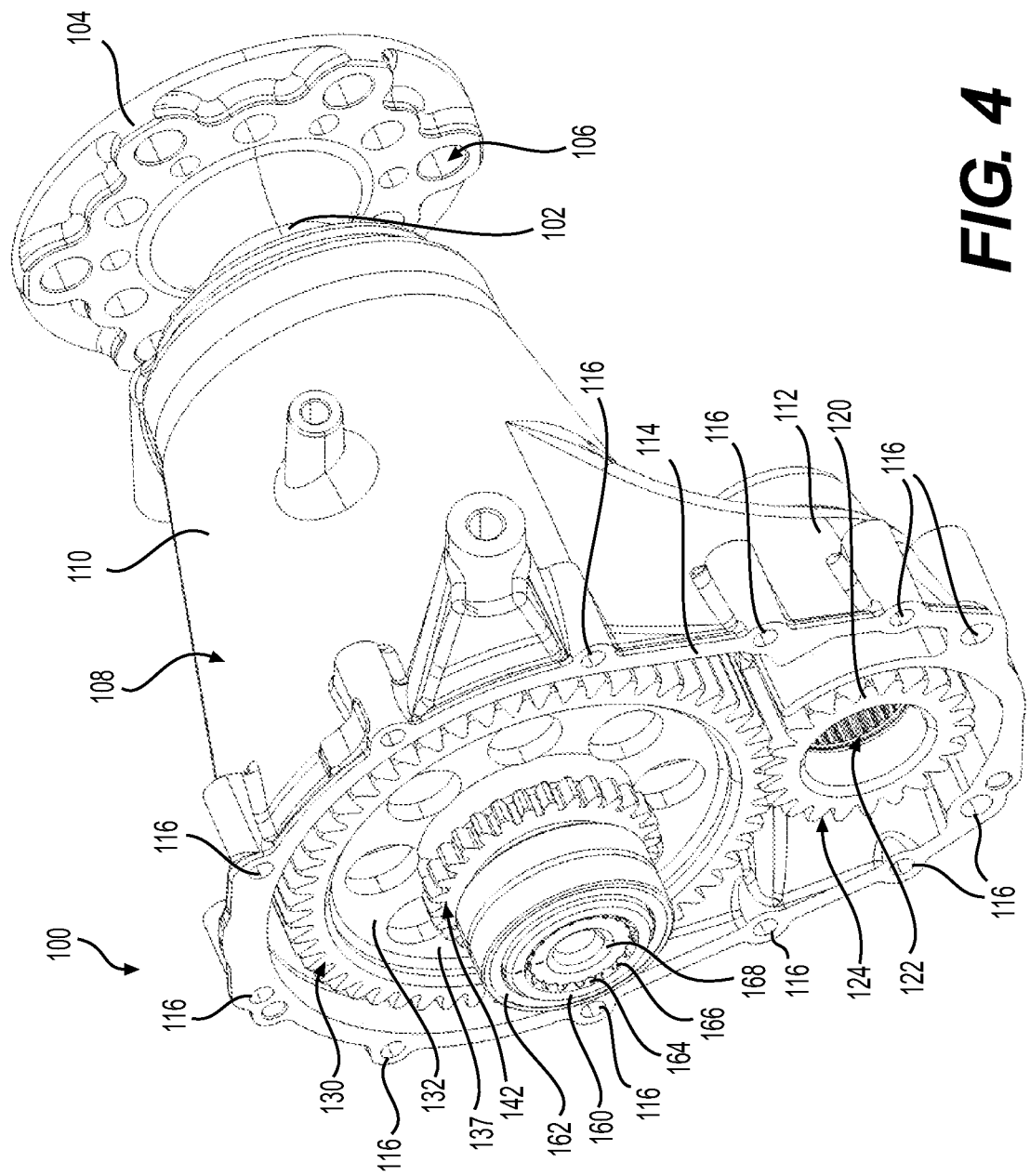
FIG. 4 is a perspective view taken from a rear, right side of the propeller drive system of FIG. 2.

As can be seen in FIG. 2, the propeller 26 is driven by the engine 28 via a propeller drive system 100. The engine 28 has a crankshaft 30 (schematically shown in FIG. 2), that drives the propeller drive system 100. The propeller drive system 100 has an output shaft 102 defining a propeller mounting flange 104. As can be seen in FIG. 1, the flange 104 is located outside the fuselage 12. The propeller mounting flange 104 defines a plurality of holes 106 (see FIG. 4). The propeller 26 has a central hub 32 from which the propeller blades 34 extend. The central hub 32 defines holes (not shown) corresponding to at least some of the holes 106 in the propeller mounting flange 104. Fasteners 36 are inserted through the holes in the central hub 32 of the propeller 26 and through the hole 106 of the flange 104 to fasten the propeller 26 to the flange 104.

Figure 3:
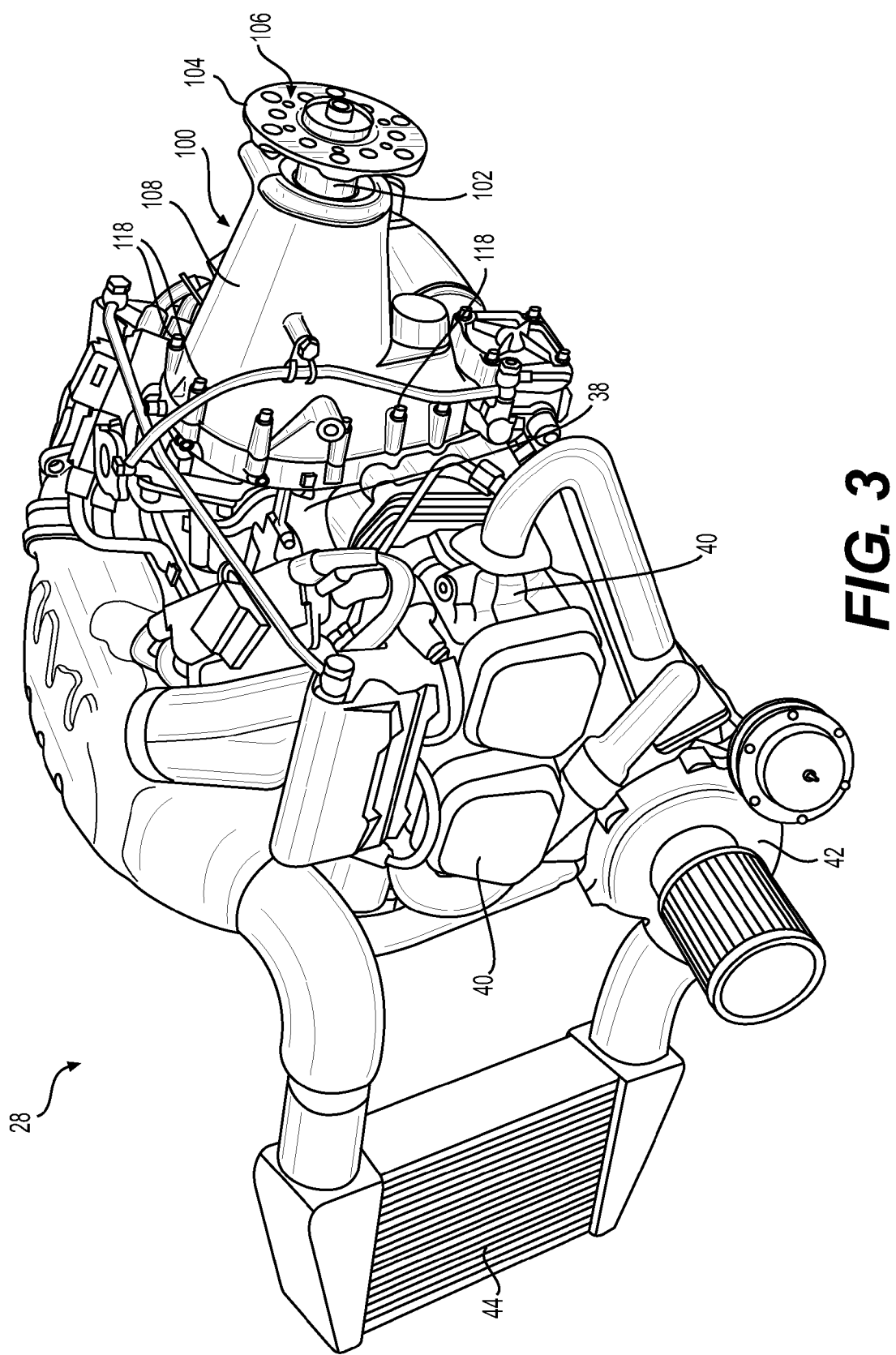
FIG. 3 is a perspective view taken from a front, right side of the engine of FIG. 1.

The engine 28 is best seen in FIG. 3. The engine 28 is an intermittent combustion internal combustion engine. In the present implementation, the engine is a fuel injected, four-stroke boxer engine 28, such as the Rotax 915 iS™ for example. Other types of intermittent combustion internal combustion engines are contemplate, such as, but not limited to, V-type engines, two-stroke engine, and Wankel rotary engines. The engine 28 has a central crankcase 38 and four horizontally extending cylinders 40 (two on each side). The crankshaft 30 is rotationally supported in and extends from the crankcase 38. The reciprocating motion of the pistons (not shown) inside the cylinders 40 rotate the crankshaft 30. The engine 28 is also provided with a turbocharger 42 and an intercooler 44, but it is contemplated that these components could be omitted. The engine 28 has many other components, but these will not be described herein.

Figure 5:
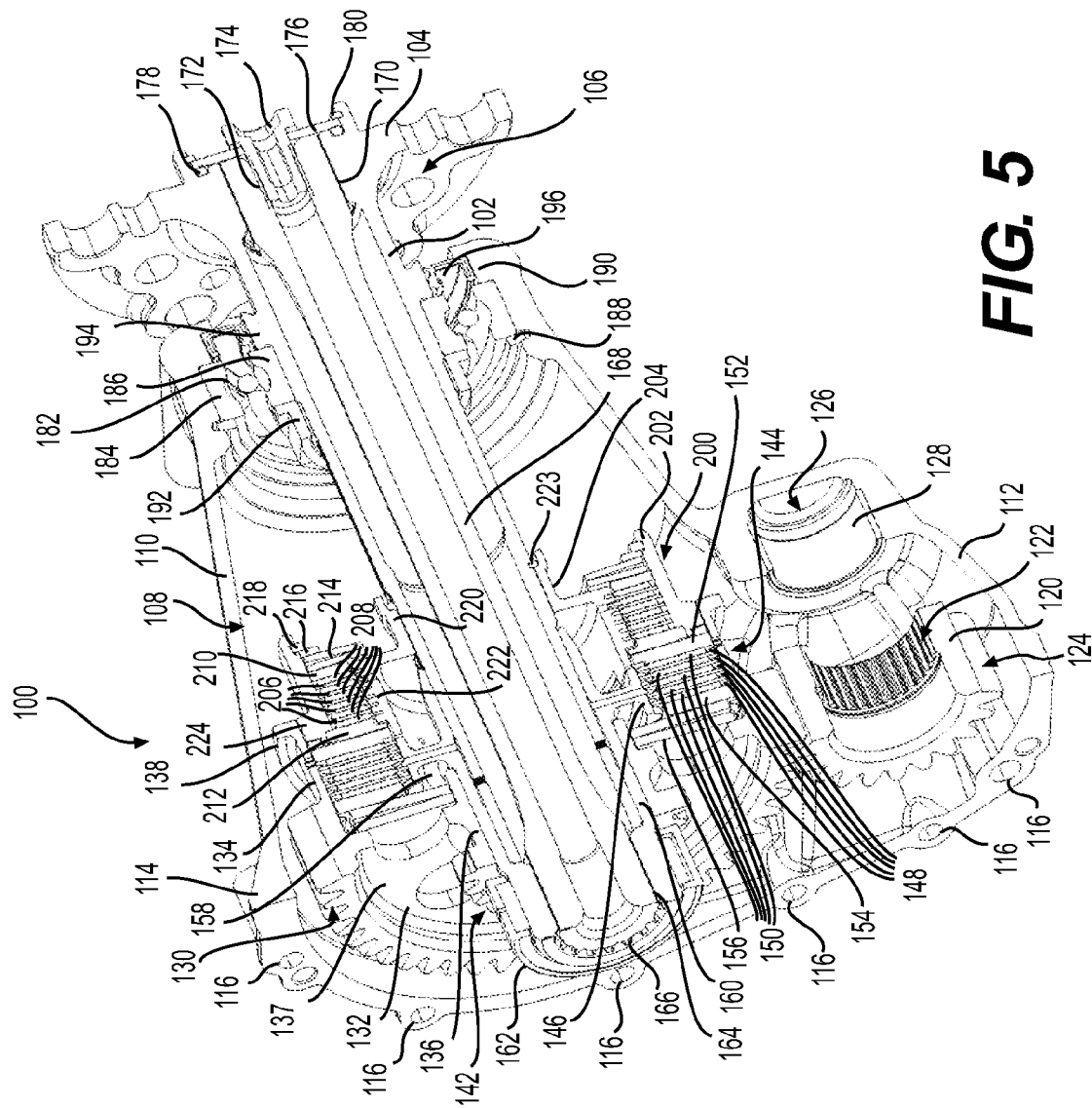
FIG. 5 is a perspective view taken from a rear, right side of a longitudinal cross-section of the propeller drive system of FIG. 4.
Figure 6:
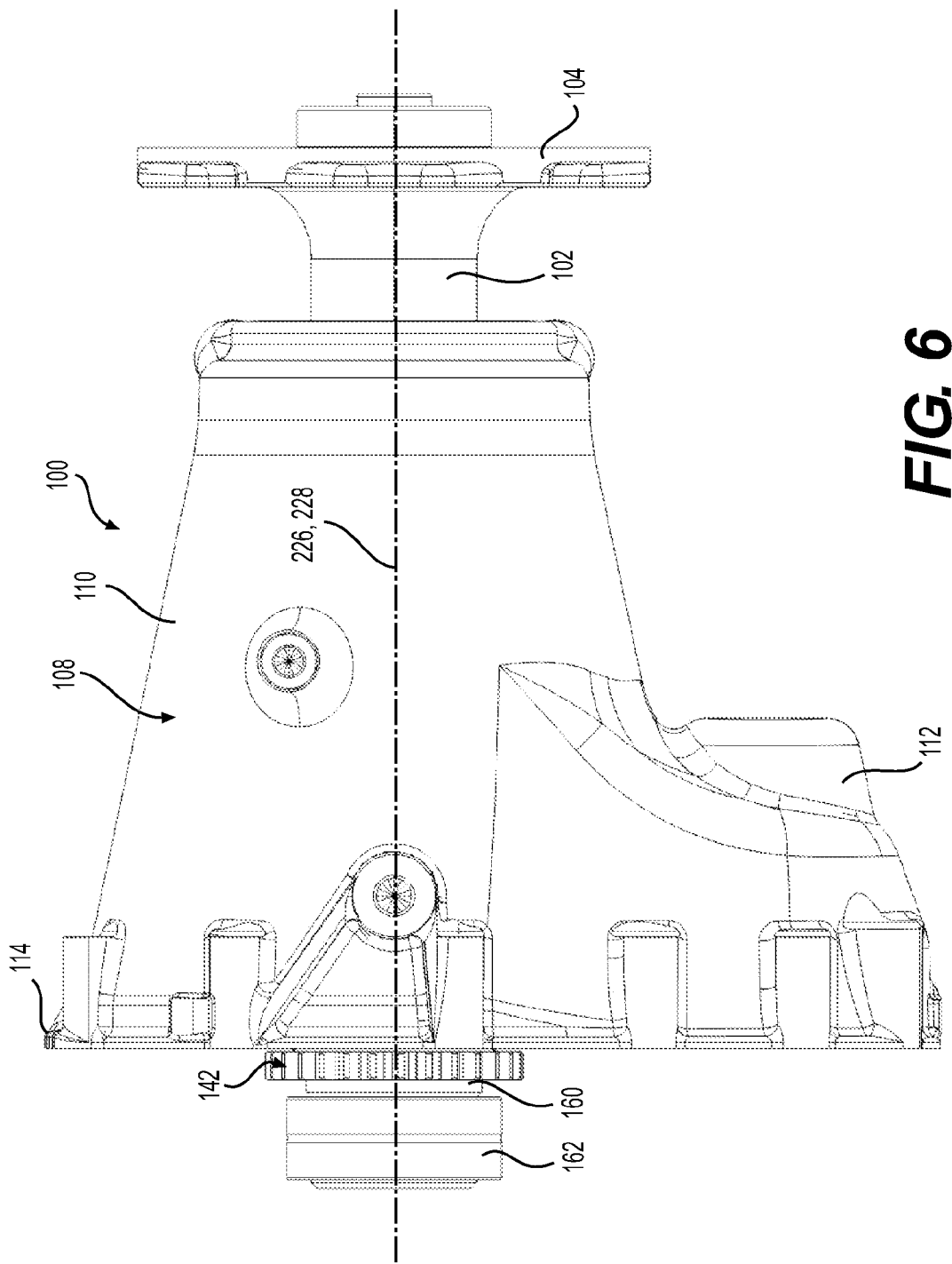
FIG. 6 is a right side elevation view of the propeller drive system of FIG. 4.

Turning now to FIGS. 4 to 11, the propeller drive system 100 will be described herein. The propeller drive system 100 has a housing 108 inside which most of the components described below are housed. The housing 108 has an upper generally frustoconical portion 110 and a lower generally frustoconical portion 112 that is integrally formed with the upper portion 110. As can be seen, the lower portion 112 is smaller than the upper portion 110. As best seen in FIG. 6, the output shaft 102 extends from a front of the upper portion 110 of the housing 108. The rear end of the housing 108 defines a flange 114. The flange 114 defines a plurality of apertures 116. Fasteners 118 (only some of which are labeled for clarity) are inserted through the apertures 116 to fasten the housing, and therefore the propeller drive system 100, to the front of the engine 28 as shown in FIG. 3.

The propeller drive system 100 has an input gear 120 located in the lower portion 112 of the housing 108. The input gear 120 has internal splines 122 and a plurality of external teeth 124. The crankshaft 30 extends through the input gear 120. The crankshaft 30 has external splines that engage the internal splines 122 of the input gear 120 such that the crankshaft 30 drives the input gear 120. The end of the crankshaft 30 is received in a recess 126 formed in the lower portion 112 of the housing 108. A bearing 128 is disposed around the end of the crankshaft 30 to rotationally support the end of the crankshaft in the recess 126.

The plurality of external teeth 124 of the input gear 120 engages a plurality of external teeth 130 of a gear 132 such that the input gear 120 drives the gear 132. As can be seen, the gear 132 has a larger diameter than the input gear 120. The gear 132 defines an outer sleeve 134 and an inner sleeve 136. A body or web 137 of the gear extends radially between the sleeves 134, 136. A front end of the outer sleeve 134 defines a radially outwardly extending flange 138. A plurality of internal teeth 140 (see FIG. 8) are also defined at the front end of the outer sleeve 134. A rear end of the inner sleeve 136 defines a plurality of external teeth 142. The plurality of external teeth 142 engage the teeth of a gear (not shown) connected to a governor (not shown).

The propeller drive system 100 also has a slip friction clutch 144. In the present implementation, the slip friction clutch 144 is a multiple-disk friction clutch, but it is contemplated that other types of friction clutches could be used. The friction clutch 144 has a driving member formed by the outer sleeve 134 of the gear 132, a driven member 146, driving friction disks 148, driven friction disks 150, a front annular plate 152, and a rear annular plate 154. The driving and driven friction disks 148, 150 are disposed in an alternating arrangement between the front and rear annular plates 152, 154. The driving friction disks 148 are rotationally fixed to the outer sleeve 134. The driven friction disks 150 are rotationally fixed to the driven member 146. A spring 156 is disposed radially between the outer and inner sleeves 134, 136 of the gear 132 and axially between the web 137 of the gear 132 and the rear annular plate 154. The spring 156 applies pressure onto the clutch 144 to compress the driving and driven friction disks 148, 150. When the torque applied to the clutch 144 is less than a slip torque of the clutch 144, the outer sleeve 134 of the gear 132 and the driven member 146 rotate together. The clutch 144 and spring 156 are designed and selected such that the clutch 144 has a slip torque that is sufficiently high so that during normal operation of the airplane 10, the clutch 144 does not slip and the outer sleeve 134 and the driven member 146 rotate together. Should the torque applied to the clutch 144 exceed the slip torque of the clutch 144, the driving and driven friction disks 148, 150 slip relative to each other and the outer sleeve 134 and the driven member 146 no longer rotate together. For example, should the propeller 34 hit the ground during a difficult landing, the torque applied to the clutch 144 exceeds the slip torque of the clutch 144, causing the clutch 144 to slip, thereby preventing the force of the impact to be transferred to the engine 28, thus helping to prevent damage to the engine 28. In one implementation, the slip torque of the clutch 144 is 600 Nm, but other slip torques are contemplated.

The driven member 146 of the clutch 144 is integrally formed with a flange 158 of a hollow shaft 160. The inner sleeve 136 of the gear 132 is disposed around the shaft 160, but is not fixed to the shaft 160. From the flange 158, the shaft 160 extends rearward and out of the rear of the housing 108. The rear end of the shaft 160 is rotationally supported by a bearing 162. The bearing 162 is supported inside a recess (not shown) formed in the front of the engine 28. The rear end of the shaft 160 has internal splines 164. The internal splines 164 engage external splines 166 of a rear end of a torsion bar 168. As can be seen, the torsion bar 168 is hollow. From its rear end, the torsion bar 168 extends forward and out the front of the housing 108. The front end of the torsion bar 168 has external splines 170. The external splines 170 engage internal splines 172 defined in the front end of the output shaft 102. As can be seen, the output shaft 102 is hollow. The output shaft 102 extends rearward around the torsion bar 168 and into the shaft 160. The shaft 160 is disposed around the output shaft 102 but is not fixed to the output shaft 102. A fastener 174 fastens a washer 176 to the front end of the torsion bar 168. An O-ring 178 is held between the washer 176 and the output shaft 102. A clip 180 is inserted in the output shaft 102 in front of the washer 176. As a result, the output shaft 102 and the torsion bar 168 are axially fixed to each other. The output shaft 102 is rotationally supported by a ball bearing 182 located in the front portion of the upper portion 110 of the housing 108. The bearing 182 has an outer race 184 and an inner race 186. The outer race 184 is held between a lock ring 188 and a step 190 formed in the upper portion 110 of the housing 108. The inner race 186 is held between a screw nut 192 threaded onto the output shaft 102 and a flange 194 formed by the output shaft 102. As a result of the arrangement, the bearing 182 and its associated components (188, 190, 192, 194) limit the axial displacement of the output shaft 102. A bearing seal 196 is disposed in front the bearing 182 and is held radially between the step 190 and the flange 194.

The propeller drive system 100 also has a slip friction clutch 200. In the present implementation, the slip friction clutch 200 is a multiple-disk friction clutch, but it is contemplated that other types of friction clutches could be used. The friction clutch 200 has a driving member 202, a driven member 204, driving friction disks 206, driven friction disks 208, a front annular plate 210, and a rear annular plate 212. The driven member 204 is rotationally fixed to the output shaft 102. The driving and driven friction disks 208, 210 are disposed in an alternating arrangement between the front and rear annular plates 210, 212. The driving friction disks 206 are rotationally fixed to the driving member 202. The driven friction disks 208 are rotationally fixed to the driven member 204. The rear annular plate 212 is disposed adjacent to the front annular plate 152. A spring 214 is disposed radially between the driving and driven members 202, 204. The spring 214 is disposed axially between the front annular plate 210 and a ring 216 abutting an inner side of the driving member 202. The ring 216 is prevented from moving axially forward by a clip 218 received in a notch in the inner side of the front portion of the driving member 202. The spring 214 applies pressure onto the clutch 200 to compress the driving and driven friction disks 202, 204. When the torque applied to the clutch 200 is less than a slip torque of the clutch 200, the driving member 202 and the driven member 204 rotate together. The clutch 200 and spring 214 are designed and selected such that the clutch 200 has a slip torque that is less than the slip torque of the clutch 144. Should the torque applied to the clutch 200, as will be described below, exceed the slip torque of the clutch 200, the driving and driven friction disks 206, 208 slip relative to each other and the driving member 202 and the driven member 204 no longer rotate together. In one implementation, the slip torque of the clutch 200 is 250 Nm, but other slip torques are contemplated.

Figure 7:
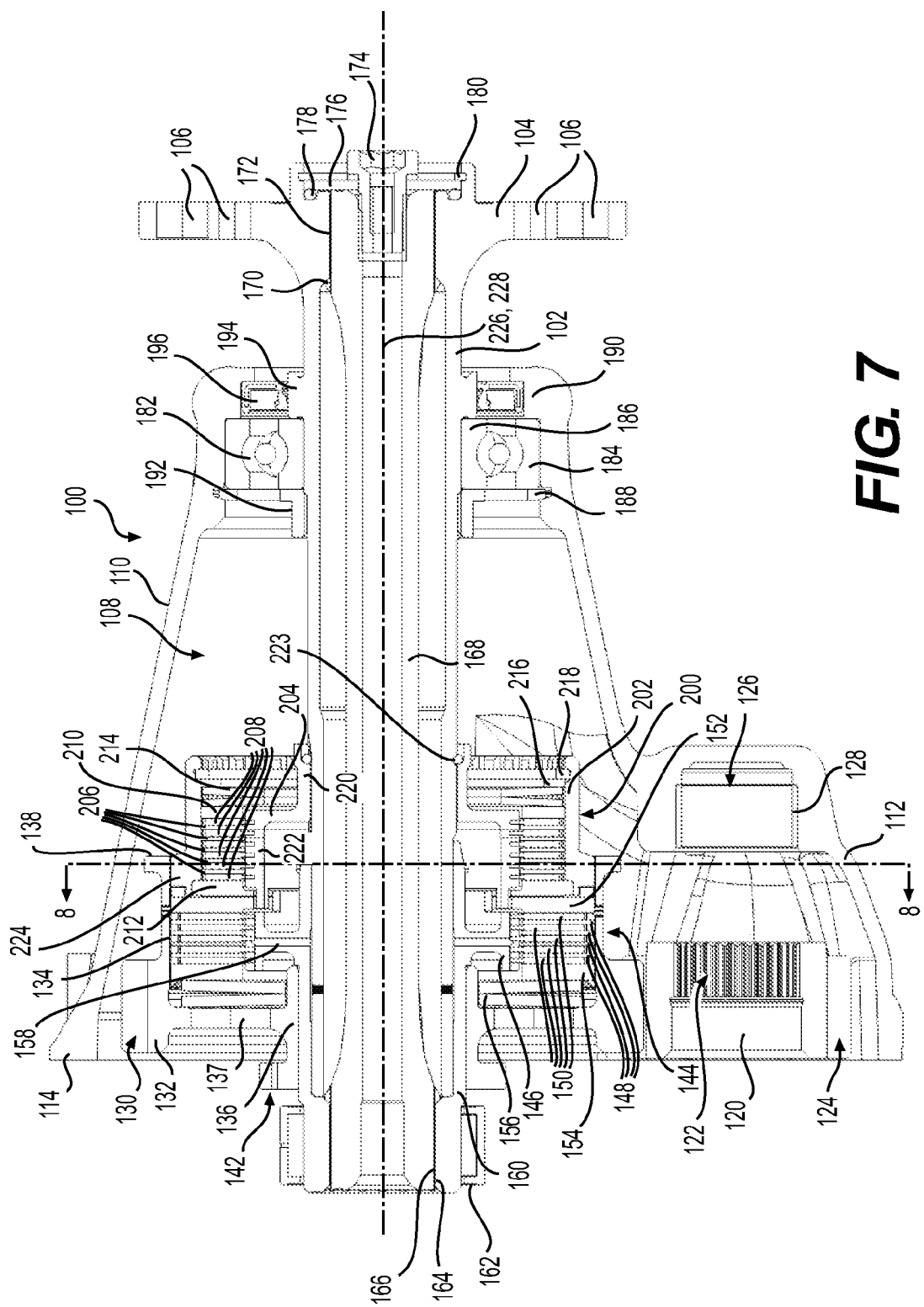
FIG. 7 is a cross-sectional view of the propeller drive system of FIG. 4 taken through line 7-7 of FIG. 8.

The driven member 204 has an inner sleeve 220 and an outer sleeve 222. The inner sleeve 220 is fixed to the output shaft 102. A ring 223 is disposed radially between a flared front end of the inner sleeve 220 and the output shaft 102 to limit axial displacement of the clutch 200. The outer sleeve 222 is disposed rearward of the inner sleeve 220. The outer sleeve 222 is radially spaced from the output shaft. As can be seen in FIGS. 5 and 7, a forward portion of the hollow shaft 160 is disposed radially between the outer 222 sleeve of the driven member 204 and the output shaft 102. The driven friction disks 210 are rotationally fixed to the outer sleeve 222 of the driven member 204.

The rear portion of the driving member 202 is disposed inside the front portion of outer sleeve 134 of the gear 132. The rear portion of the driving member 202 has a plurality of external teeth 224 which selectively engage the plurality of internal teeth 140 of the gear 132 as will be discussed in greater detail below.

Figure 8:
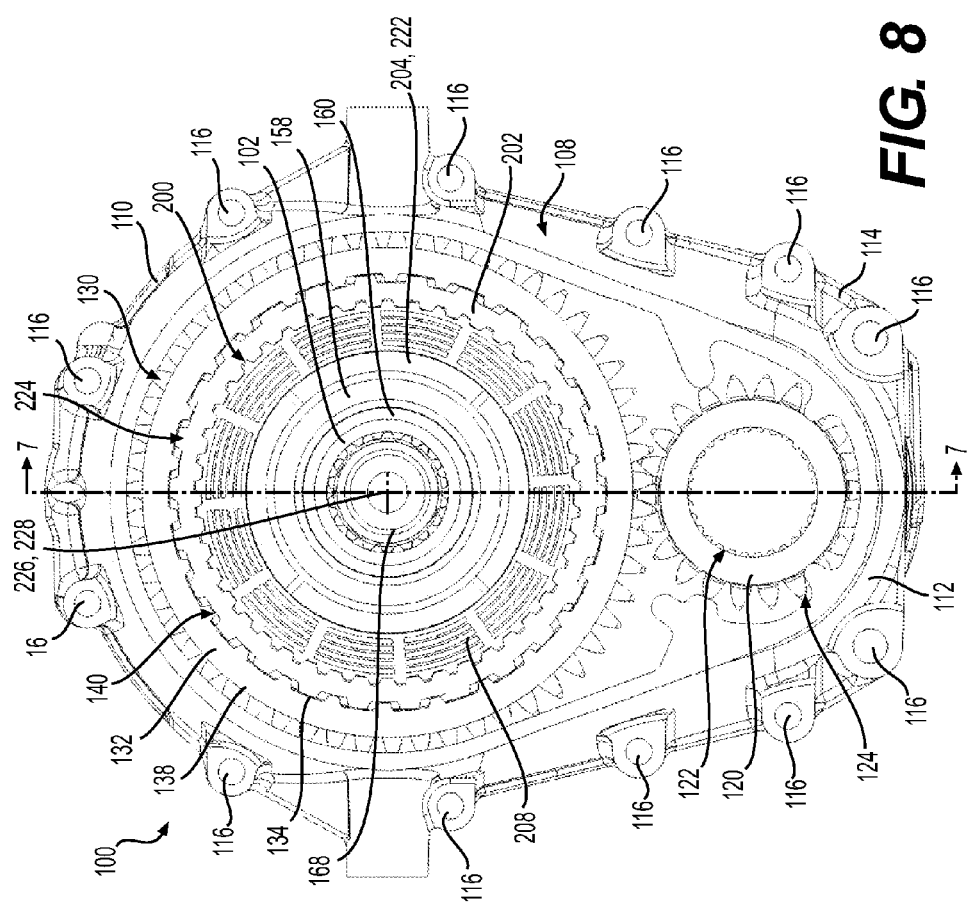
FIG. 8 is a cross-sectional view of the propeller drive system of FIG. 4 taken through line 8-8 of FIG. 7.

As best seen in FIGS. 7 and 8, the output shaft 102, the gear 132, the clutch 144, the torsion bar 168, and the clutch 200 are coaxial and rotated about a rotation axis 226 (see FIGS. 6 to 9). As will be discussed below, the torsion bar 168 twists when the engine 28 drives the propeller 26. When the torsion bar 168 twists, the front end of the torsion bar 168 rotates relative to the rear end of the torsion bar 168 about a torsion axis 228 (see FIGS. 6 to 9), which corresponds to the rotation axis 226.

Figure 9:
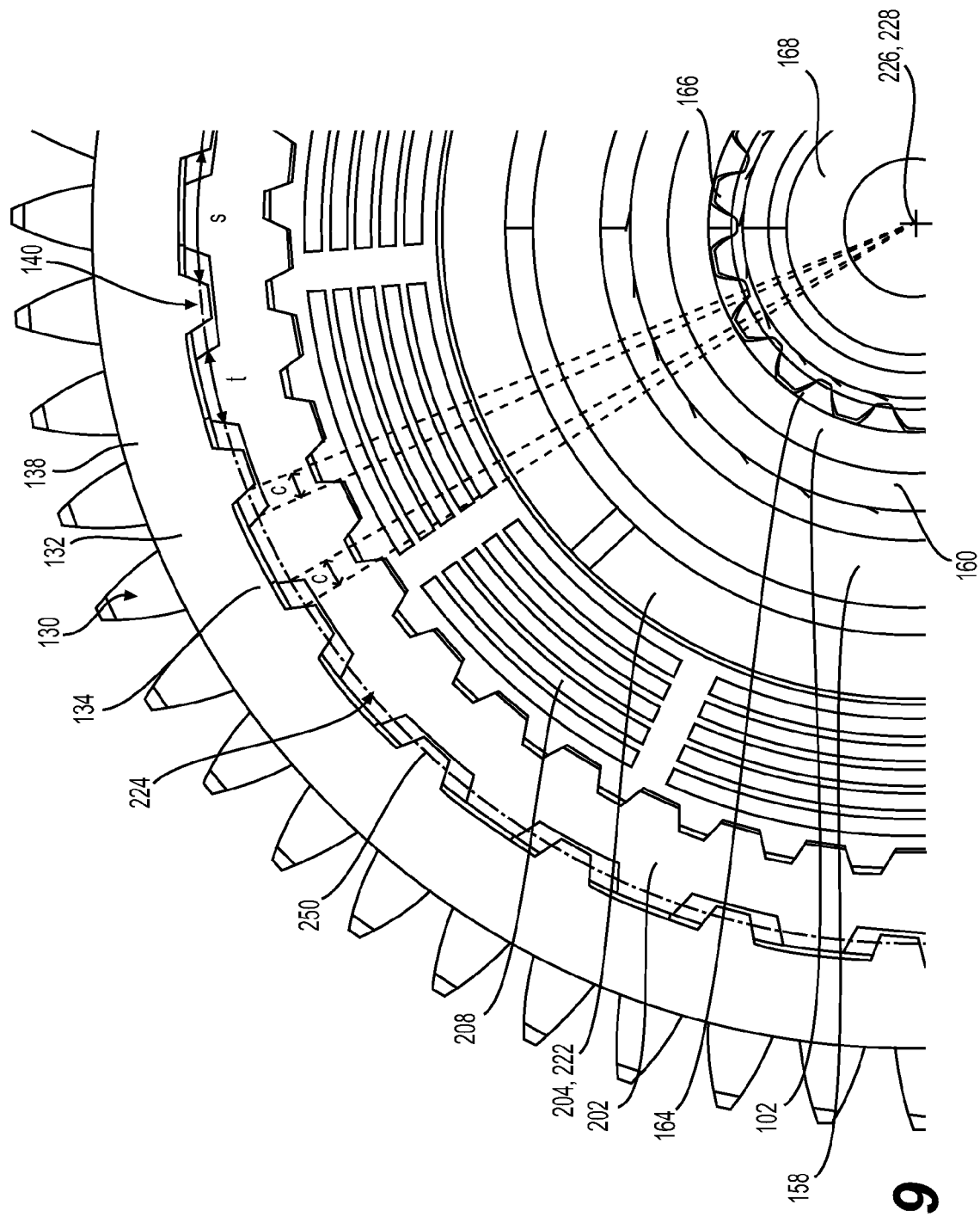
FIG. 9 is a close-up view of an upper left portion of FIG. 8 with a housing of the propeller drive system removed for clarity and in a first position of the torsion bar of the propeller drive system.

Turning now to FIG. 9, the internal teeth 140 of the gear 132 and the external teeth 224 of the driving member 202 of the clutch 200 will be described in more detail. The gear 132 and the driving member 20, which defines a gear with the teeth 224, have a common pitch circle 250. Each spacing between adjacent internal teeth 140 of the gear 132 has an arc length S measured along the pitch circle 250. Each tooth 224 of the driving member 202 of the clutch 200 has a circular thickness t measured along the pitch circle 250. The circular thickness is the length of the arc between the two sides of the tooth 224 along the pitch circle 250. As can be seen, the circular thickness t is smaller than the arc length S. As a result, when the teeth 224 are centered between the teeth 140 they are angularly spaced from the teeth 140. Each tooth 224 is angularly spaced from each of its two adjacent teeth 140 by a clearance angle C. The clearance angle C is measure about the rotation axis 226 and is the angle between the intersection of the pitch circle 250 with the face of the tooth 224 and the intersection of the pitch circle 250 with the adjacent face of the tooth 140. In the implementation, the clearance angle C is 2.5 degrees. In an alternative implementation, the clearance angle C is 1.5 degrees. In other alternative implementations, the clearance angle C is at least 0.75 degrees. The clearance angle C is greater than the backlash angle resulting from manufacturing tolerances that would be present in a constantly engaging pair of gears having the same diameters as the gear 132 and the driving member 202.

When the propeller 26 turns during operation of the airplane 10, it tends to do so at a constant speed, but the speed of rotation of the crankshaft 30 of the engine 28 varies. The speed of rotation of the crankshaft 30 increases during power strokes of the engine 28 and decreases during compression strokes of the engine 28. As a result, the output shaft 102 rotates at a constant speed, but the input gear 120 varies in speed. The torsion bar 168 and the clutch 200 contribute to diminish the stress and wear of the propeller drive system 100 as explained below.

When the engine 28 is operating at full power, the crankshaft 30 drives the input gear 120, the input gear 120 drives the gear 132, the gear 132 drive the torsion bar 168 via the clutch 144 which does not slip, the torsion bar 168 drives the output shaft 102, and the output shaft 102 drives the propeller 26. Under such operating conditions, the front end of the torsion bar 168 rotates (i.e. twists) relative to the rear end of the torsion bar 168 by a varying torsion angle, due to the torque variations of the engine 28. The average angle of this varying torsion angle is referred to herein as the mean torsion angle. In the present implementation, the mean torsion angle is 5 degrees. When the torsion bar 168 is twisted by the mean torsion angle, the teeth 224 of the driving member 202 are centered between the teeth 140 of the gear 132 as shown in FIGS. 8 and 9. The variation in torsion angle due to torque variations is less than the clearance angle C. In the present implementation, the variation in torsion angle is 1.5 degrees in each direction from the mean torsion torsion angle. Since the teeth 224 only move by 1.5 degrees in each direction from their position shown in FIG. 9 and the clearance angle is 2.5 degrees, the teeth 224 never engage the teeth 140. As such no torque is transferred between the gear 132 and the output shaft 102 via the clutch 200 and the clutch 200 does not slip. During such a steady state operation, the torsion bar 168 absorbs the vibrational energy.

Figure 10:
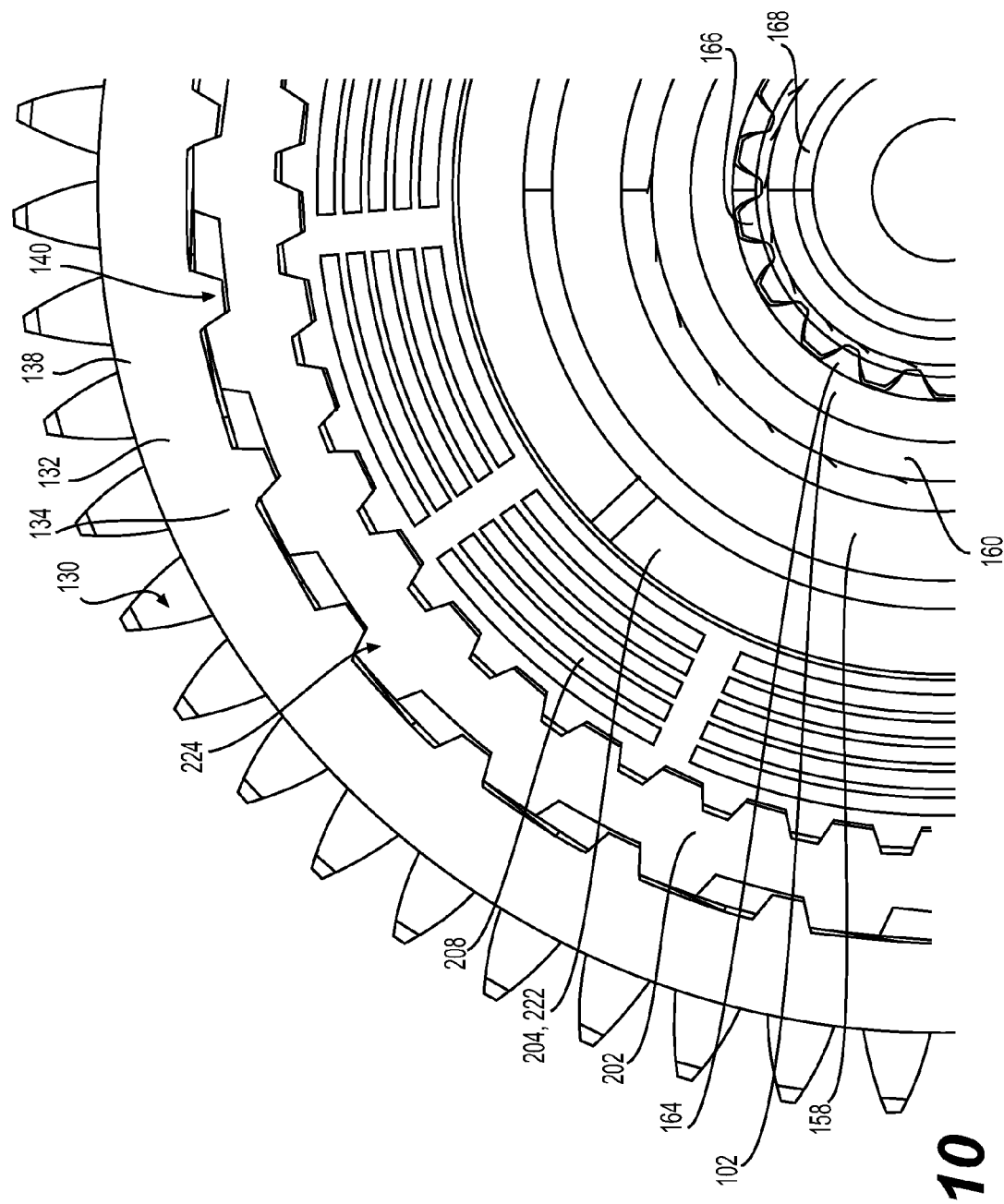
FIG. 10 is a close-up view of an upper left portion of FIG. 8 with a housing of the propeller drive system removed for clarity and in a second position of the torsion bar.
Figure 11:
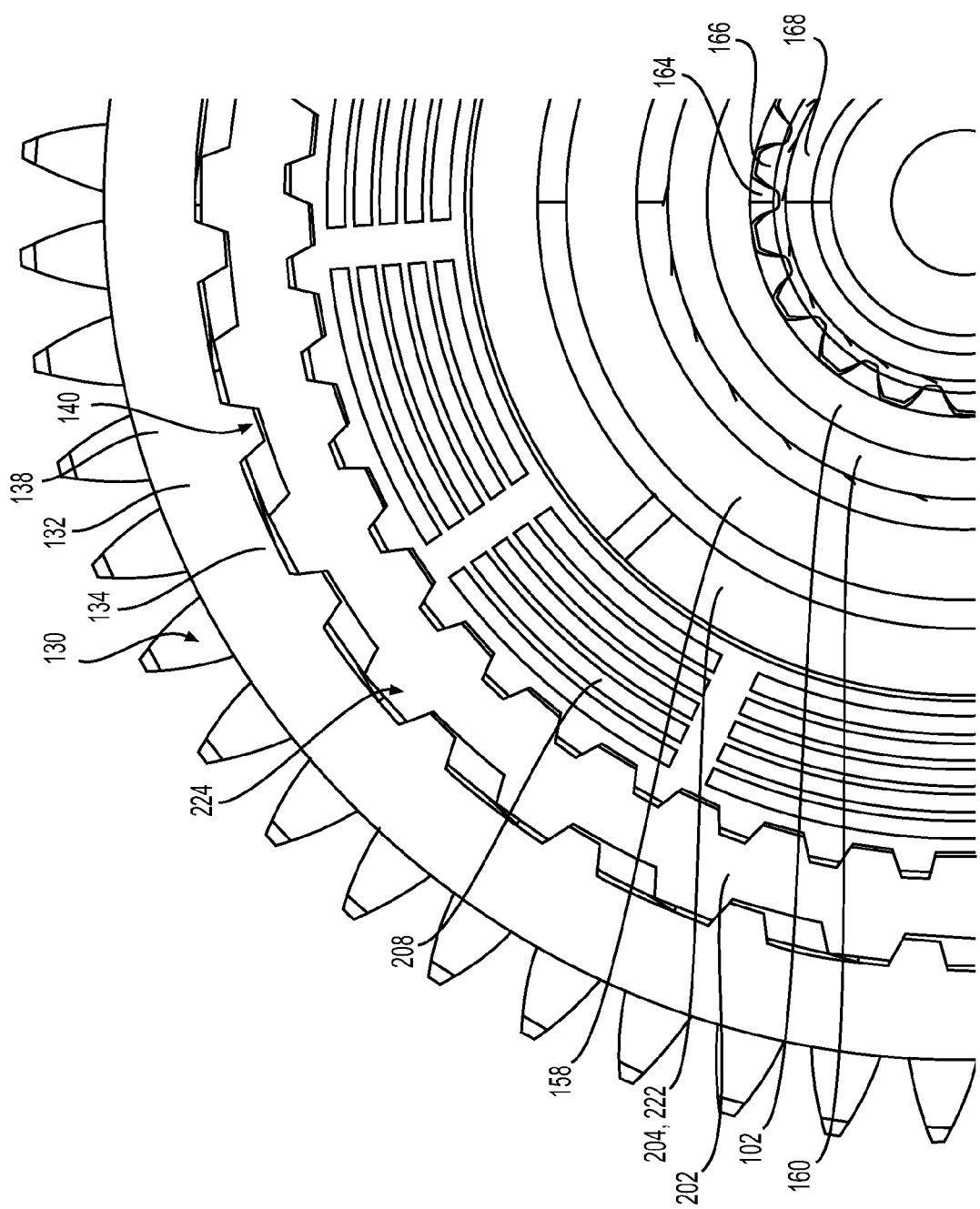
FIG. 11 is a close-up view of an upper left portion of FIG. 8 with a housing of the propeller drive system removed for clarity and in a third position of the torsion bar.

During engine start-up, a resonance situation can occur as previously explained. During such a situation, should the variation in torsion angle from the mean torsion angle exceed the clearance angle C, the teeth 224 of the driving member 202 make contact with and engage the teeth 140 of the gear 132 as shown in FIGS. 10 and 11. When the excess variation in torsion angle results in the front end of the torsion bar 168 rotating clockwise relative to the rear end of the torsion bar 168 (as viewed from a front of the airplane 10), the teeth 140 and 224 engage as shown in FIG. 10. When the excess variation in torsion angle results in the front end of the torsion bar 168 rotating counter-clockwise relative to the rear end of the torsion bar 168 (as viewed from a front of the airplane 10), the teeth 140 and 224 engage as shown in FIG. 11. When the teeth 224 of the driving member 202 engage the teeth 140 of the gear 132, torque is transferred between the output shaft 102 and the gear 132 via the clutch 200. Should the torque transferred between the driving member 202 and the gear due to the engagement of the teeth 224, 140 exceed the slip torque of the clutch 200, the driving member 202 of the clutch 200 rotates relative to the driven member 204 of the clutch 200. When this occurs, the clutch 200 is said to be slipping. When the clutch 200 slips, the driving and driven friction disks 206, 208 move relative to each other, thereby generating a significant amount of friction. This friction acts to dampen the variations in torsion angle of the torsion bar 168 during such operating conditions. Another situation where the teeth 224 of the driving member 202 can engage the teeth 140 of the gear 132 is during a load change of the engine 28, even when a resonance situation does not occur. When the load of the engine 28 changes, the mean torsion angle also changes, which can initially cause contact between the teeth 140 and the teeth 224. After a few engine cycles, the gear 132 and the driving member 202 realign such that at the mean torsion angle the teeth 224 are centered between the teeth 140 as shown in FIG. 9.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An aircraft propeller drive system for an aircraft, the aircraft having a propeller driven by an intermittent combustion internal combustion engine via the propeller drive system, the propeller drive system comprising:
   a gear adapted to be operatively connected to and driven by the engine, the gear having a first plurality of teeth, a spacing of adjacent teeth of the first plurality of teeth along a pitch circle of the gear having an arc length;
   a torsion bar having a first end and a second end opposite the first end, the first end being connected to and driven by the gear about a torsion axis, the second end being rotatable relative to the first end about the torsion axis by a torsion angle; and
   an output shaft fixedly connected to and driven by the second end of the torsion bar, the output shaft being adapted for being connected to the propeller; and
   a clutch having a driving member and a driven member, the driven member being rotationally fixed to the output shaft, the driving member having a second plurality of teeth, teeth of the second plurality of teeth having a circular thickness, the second plurality of teeth selectively engaging the first plurality of teeth, the circular thickness being less than the arc length of the spacing of adjacent teeth of the first plurality of teeth such that when one tooth of the second plurality of teeth is received and centered between two adjacent teeth of the first plurality of teeth the one tooth of the second plurality of teeth is angularly spaced from each of the two adjacent teeth of the first plurality of teeth by a clearance angle of at least 0.75 degrees, the second plurality of teeth engaging the first plurality of teeth when a variation in the torsion angle from a mean torsion angle is greater than the clearance angle, and torque being transferred between the gear and the output shaft via the clutch when the second plurality of teeth engages the first plurality of teeth.

2. The aircraft propeller drive system of claim 1, wherein:
the output shaft is at least partially hollow;
the torsion bar is disposed at least partially inside the output shaft; and
the output shaft and the torsion bar are coaxial.

3. The aircraft propeller drive system of claim 2, wherein the gear, the torsion bar, the output shaft and the clutch are coaxial.

4. The aircraft propeller drive system of claim 3, wherein:
the output shaft is disposed inside the driven member of the clutch;
the first plurality of teeth is a plurality of internal teeth;
the second plurality of teeth is a plurality of external teeth; and
the driving member of the clutch is disposed at least partially inside the gear.

5. The aircraft propeller drive system of claim 1, wherein the torsion bar passes through the gear and is coaxial with the gear.

6. The aircraft propeller drive system of claim 1, wherein the clutch is a first clutch;
the aircraft propeller drive system further comprising a second clutch having a driving member and a driven member, the driven member of the second clutch being rotationally fixed to the first end of the torsion bar, the driving member of the second clutch being formed by a portion of the gear; and
wherein the gear drives the torsion bar via the second clutch.

7. The aircraft propeller drive system of claim 6, wherein:
the first and second clutches are slip friction clutches; and
the second clutch has a higher slip torque than the first clutch.

8. The aircraft propeller drive system of claim 1, wherein the gear is a first gear having a third plurality of teeth;
the aircraft propeller drive system further comprising a second gear adapted to be operatively connected to and driven by the engine, the second gear having a fourth plurality of teeth engaging the third plurality of teeth, the first gear being driven by the engine via the second gear.

9. An aircraft comprising:
a fuselage;
wings connected to the fuselage;
an intermittent combustion internal combustion engine connected to one of:
the fuselage, and
one of the wings;
a propeller drive system connected to the engine; and a propeller connected to the propeller drive system and driven by the engine via the propeller drive system, the propeller drive system comprising:
a gear operatively connected to and driven by the engine, the gear having a first plurality of teeth, a spacing of adjacent teeth of the first plurality of teeth along a pitch circle of the gear having an arc length;
a torsion bar having a first end and a second end opposite the first end, the first end being connected to and driven by the gear about a torsion axis, the second end being rotatable relative to the first end about the torsion axis by a torsion angle; and an output shaft fixedly connected to and driven by the second end of the torsion bar, the output shaft being connected to the propeller; and
a clutch having a driving member and a driven member, the driven member being rotationally fixed to the output shaft, the driving member having a second plurality of teeth, teeth of the second plurality of teeth having a circular thickness, the second plurality of teeth selectively engaging the first plurality of teeth, the circular thickness being less than the arc length of the spacing of adjacent teeth of the first plurality of teeth such that when one tooth of the second plurality of teeth is received and centered between two adjacent teeth of the first plurality of teeth the one tooth of the second plurality of teeth is angularly spaced from each of the two adjacent teeth of the first plurality of teeth by a clearance angle of at least 0.75 degrees, the second plurality of teeth engaging the first plurality of teeth when a variation in the torsion angle from a mean torsion angle is greater than the clearance angle, and torque being transferred between the gear and the output shaft via the clutch when the second plurality of teeth engages the first plurality of teeth.

10. The aircraft of claim 9, wherein:
the output shaft is at least partially hollow;
the torsion bar is disposed at least partially inside the output shaft; and
the output shaft and the torsion bar are coaxial.

11. The aircraft of claim 10, wherein the gear, the torsion bar, the output shaft and the clutch are coaxial.

12. The aircraft of claim 11, wherein:
the output shaft is disposed inside the driven member of the clutch;
the first plurality of teeth is a plurality of internal teeth;
the second plurality of teeth is a plurality of external teeth; and
the driving member of the clutch is disposed at least partially inside the gear.

13. The aircraft of claim 9, wherein the torsion bar passes through the gear and is coaxial with the gear.

14. The aircraft of claim 9, wherein the clutch is a first clutch;
the propeller drive system further comprising a second clutch having a driving member and a driven member, the driven member of the second clutch being rotationally fixed to the first end of the torsion bar, the driving member of the second clutch being formed by a portion of the gear; and
wherein the gear drives the torsion bar via the second clutch.

15. The aircraft of claim 14, wherein:
the first and second clutches are slip friction clutches; and the second clutch has a higher slip torque than the first clutch.

16. The aircraft of claim 9, wherein the gear is a first gear having a third plurality of teeth;

the propeller drive system further comprising a second gear adapted to be operatively connected to and driven by the engine, the second gear having a fourth plurality of teeth engaging the third plurality of teeth, the first gear being driven by the engine via the second gear.

* * * * *

UNITED STATES PATENT AND TRADEMARK OFFICE
CERTIFICATE OF CORRECTION

PATENT NO. : 9,745,074 B2
APPLICATION NO. : 14/870971
DATED : August 29, 2017
INVENTOR(S) : Harald Mittermaier et al.

Page 1 of 1

It is certified that error appears in the above-identified patent and that said Letters Patent is hereby corrected as shown below:

In the Specification

Column 9, Line 11, "driving member 20" should read -- driving member 202 --

Signed and Sealed this
Sixteenth Day of January, 2018

Joseph Matal
*Performing the Functions and Duties of the
Under Secretary of Commerce for Intellectual Property and
Director of the United States Patent and Trademark Office*